Feb. 5, 1952   H. R. ROGERS   2,584,292
STOP LIGHT MECHANISM FOR MOTOR VEHICLES
Filed March 14, 1950   2 SHEETS—SHEET 1
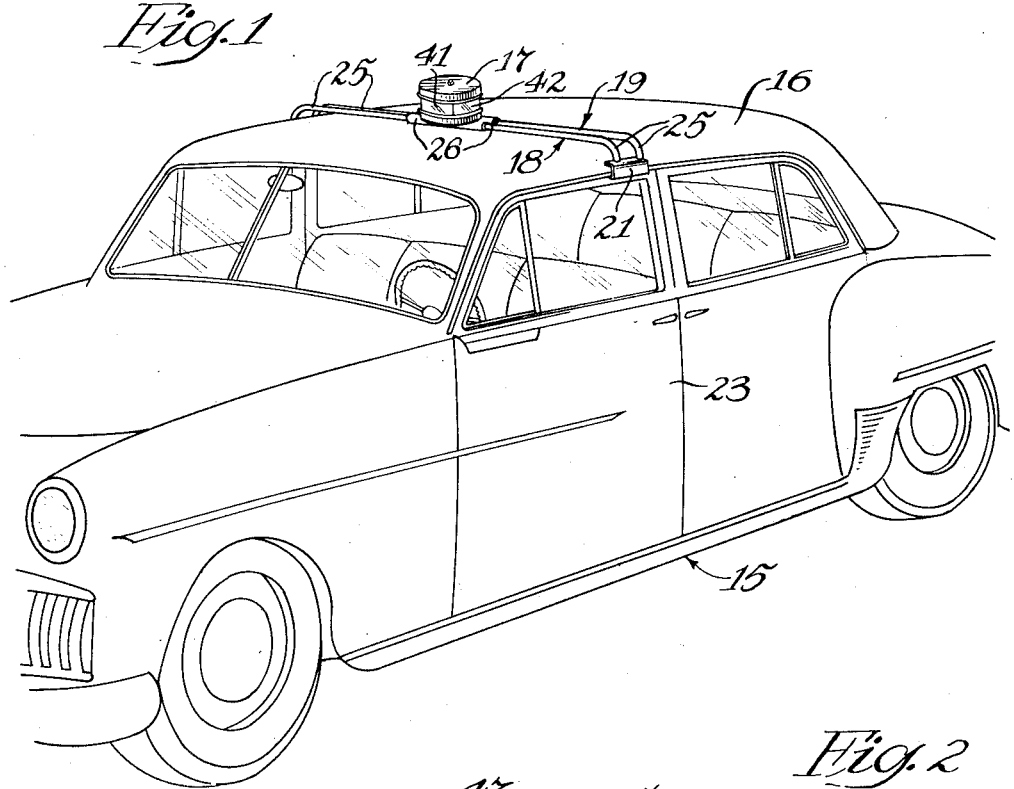
Fig. 1
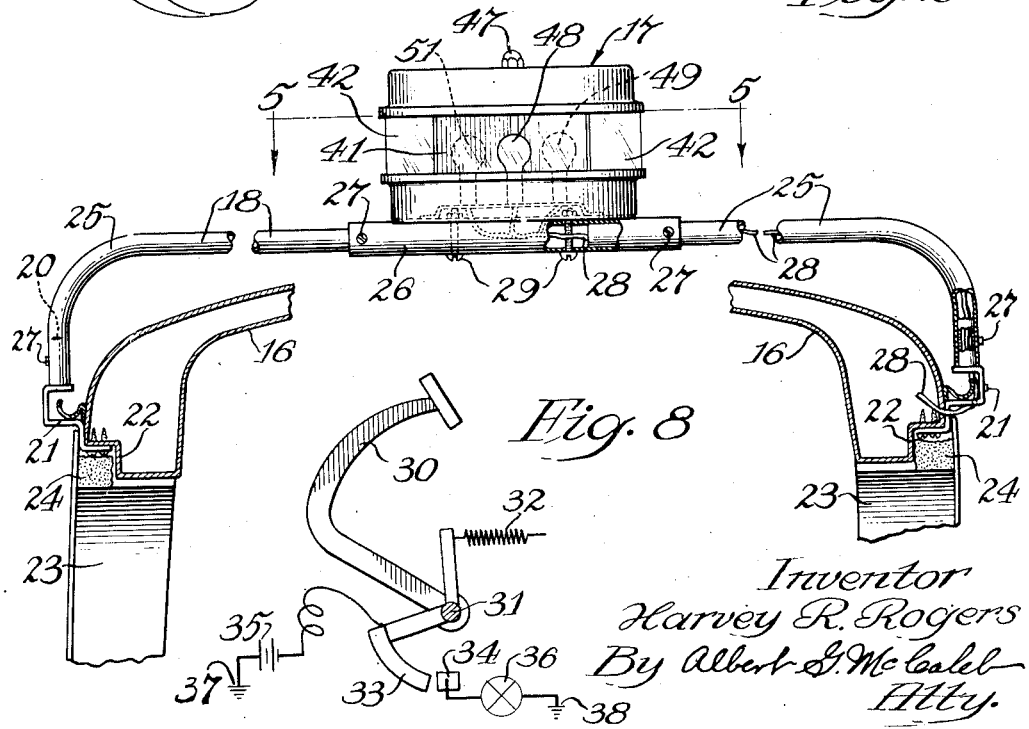
Fig. 2
Fig. 8
Inventor
Harvey R. Rogers
By Albert G. McCaleb
Atty.

Feb. 5, 1952 — H. R. ROGERS — 2,584,292
STOP LIGHT MECHANISM FOR MOTOR VEHICLES
Filed March 14, 1950 — 2 SHEETS—SHEET 2
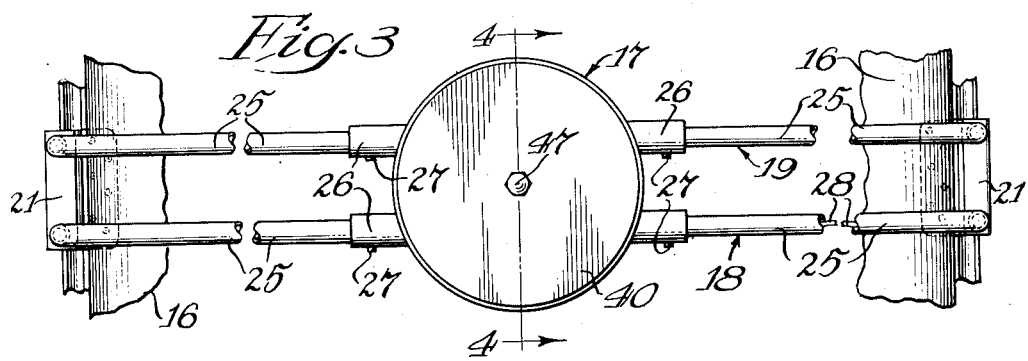
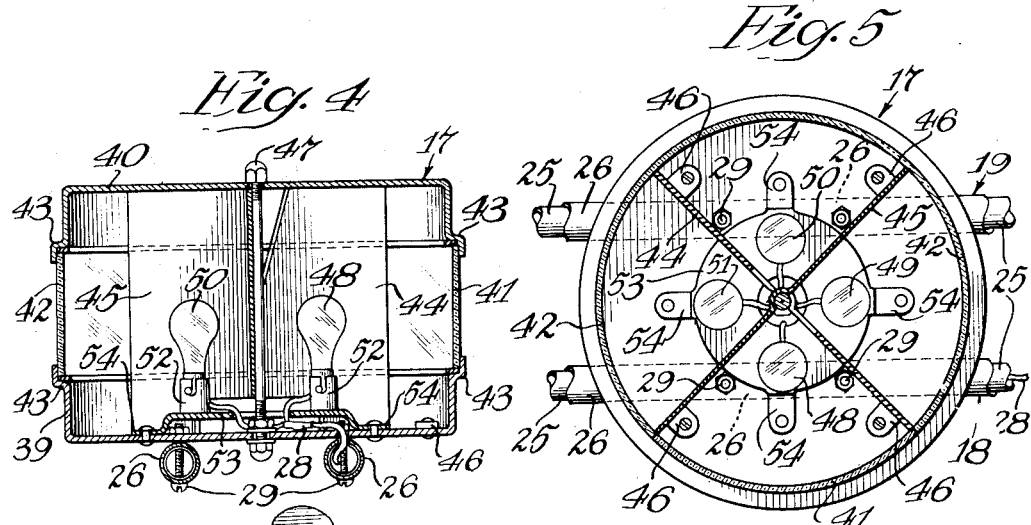
Inventor
Harvey R. Rogers
By Albert G. McCaleb
Atty.

Patented Feb. 5, 1952

2,584,292

UNITED STATES PATENT OFFICE 2,584,292

STOP LIGHT MECHANISM FOR MOTOR VEHICLES

Harvey R. Rogers, Springfield, Ill.

Application March 14, 1950, Serial No. 149,637

6 Claims. (Cl. 177—329)

1

This invention relates to improvements in stop light mechanism for motor vehicles, and it has for its object the provision of an improved construction by the use of which better and more reliable stop light signaling effects shall result.

It is one of the objects of my invention to provide for greatly improved visibility of the stop light whereby it can be observed easily and effectively from a position in front of the vehicle, or from the rear, or from either side, so as to enable pedestrians and the drivers of other vehicles to know promptly what are the intentions of a driver and thus to act in cooperation for expediting the movement of both vehicles and pedestrians for avoiding interference and accidents. For attaining this object, I have mounted my improved stop light in elevated position so that it can be seen readily from a substantial distance by drivers of other vehicles coming from the rear in the same line of traffic, and by pedestrians or drivers approaching from the front or from either side.

It is one of the objects of my invention to provide an improved construction of the lamp housing and the cooperating parts by which the desired signaling is effected and the cooperating parts by which the housing and the associated parts are mounted in position and connected for effective operation.

Other objects and advantages will be apparent also from the following description of an exemplary embodiment of my invention disclosed for illustrative purposes by reference to the accompanying two sheets of drawings, in which:

Fig. 1 is a perspective view of an automobile equipped with my invention;

Fig. 2 is a vertical sectional view through a fragmentary portion of the body of the automobile as shown in Fig. 1, with my invention mounted thereon;

Fig. 3 is a top plan view of the lamp housing of my improved device and the associated parts substantially as shown in Fig. 2;

Fig. 4 is a vertical sectional view taken substantially at the line 4—4 in Fig. 3;

Fig. 5 is a horizontal sectional view through the lamp housing taken substantially at the line 5—5 in Fig. 2;

Fig. 6 is a perspective view of one of my improved brackets employed for mounting the device on the automobile body;

Fig. 7 is a perspective view of the dividers by which the interior of the lamp housing is divided into sections; and Fig. 8 is a diagrammatic view showing an operative form of the switching means operated by the foot lever of the braking mechanism of the automobile for effecting the control of the stop light circuit by the movement of the foot lever.

Referring now to the several figures of the drawings, in which corresponding parts are indicated by the same reference characters, 15 indicates an automobile having my improved stop light mounted on top of the body 16 thereof. In the construction illustrated, a lamp housing 17 is mounted above the body 16 by means of a yoke comprising two tubular bar members 18 and 19, having outer ends extending downwardly from substantially parallel arms of the tubular bar members and mounted on lugs or posts 20 (see Fig. 6) rising from the top faces of brackets 21 which are firmly secured by screws to the lintel bars 22 of the side doors of the automobile, as is clearly shown in Fig. 2. The bottom plate portions of the brackets 21 are of such small size that they do not in any way interfere with the movements of the doors 23 which carry the usual sponge rubber strips 24 on the top faces.

In my improved construction, each of the tubular members 18—19 is made up of three pieces, comprising end bar portions 25 and a connecting sleeve 26 so as to enable the effective length of the bar to be adjusted to fit car bodies of different widths. At both ends of each of the end bar portions, set screws 27 are provided for clamping the parts in position and so as to avoid rattling of the parts. As shown in Fig. 6, one of the posts 20 is made hollow so as to permit the electric lead wire 28 for the lamp means to be threaded through the post and through one of the yoke bars. The lamp housing 17 is secured in position by means of bolts 29 passing through the bottom wall of the housing and through the sleeves 26, as is clearly shown in Fig. 4.

The switch means for controlling the energization of the lamp means in the housing 17 is illustrated only diagrammatically. In the arrangement as shown in Fig. 8, the usual foot lever 30 for operating the brakes of the automobile is mounted for swinging movement on a shaft 31, a coiled spring 32 being provided for holding the lever swung normally to the limit of its motion in clockwise direction in said Fig. 8. As the foot lever is depressed toward the left in said figure for causing the brakes to be applied, a contact arm 33 adapted to swing with the lever is brought into wiping engagement with a contact 34 for closing the electrical circuit from the car battery 35 through said contacts and through the lamp means 36, the battery and the lamp means being grounded to the metal framework of the car as usual, as at 37 and 38. The arrangement is such that the circuit through the lamp means is completed and operative during the entire period when the brakes are on and is broken promptly when the brakes are released.

As is best shown in Fig. 4, the housing 17 comprises two circular cap members 39 and 40, preferably pressed from sheet aluminum, with side wall portions 41 and 42 interposed between the cap members, such side wall portions being formed preferably of strips of plastic in sheet form, secured between offset shoulders 43 pressed in the edge portions of the caps. The space within the housing is divided by cross-positioned metal divider plates 44 and 45 having reflective faces; such plates being notched in the construction illustrated for expediting their interengagement, being held in fixed position in the cap member 39 by suitable rivets passing through ears 46 formed on the plates 44 and 45 at their lower edges. With the side wall members 41 and 42 and the divider plates 44 and 45 in position in the cap member 39, the upper cap member 40 is placed in position embracing the side wall members and a headed bolt 47 is secured in position in openings through the cap members for holding the several housing parts in operative position.

In the construction shown in Fig. 5, the lamp means 36 comprises four electric light bulbs 48, 49, 50 and 51, mounted in sockets 52 carried by a mounting plate or base 53 secured to the bottom wall of the cap member 39 by means of rivets passing through ears 54 extending outwardly from the plate 53. The arrangement is such that the several lamps are centered with respect to the housing sections in which they are positioned, so as to cause effective reflection of the light from the housing through the side wall members 41 and 42 at the same level with the lamps.

The several lamps 48, 49, 50 and 51 are preferably connected in parallel, between the battery 35 and the switch comprising the contact members 33 and 34, so that all four of the lamps are energized at the same time. As will be appreciated from the above description, when the brake lever 30 is depressed so as to close the switch 33—34, all four of the lamps are lighted at the same time, the light from the lamps being projected outwardly effectively through the plastic side wall members 41 and 42. In the preferred construction, the wall member 42 is preferably red so as to cause the light from the lamps 49, 50 and 51 to give a red light effect outside of the housing 17 at the rear face and at both side faces of the housing. The side wall member 41, on the other hand, is preferably of a white color, or of any other color, as desired, other than red, so as to give the same warning effect as that of the red light at the rear and the sides but avoiding the use of a red light signal toward the front of the automobile. In states where it is objectionable to project a red light signal toward the front, the side wall portions of the housing might be red about the entire periphery of the housing, at the option of the car owner, it being an easy matter to replace a side wall member of a different color if desired. The effectiveness of the signal under any circumstances is not greatly affected by the color scheme selected.

By the use of my improved construction, an effective indication is given automatically in every instance when the brakes are applied on a motor vehicle, such indication being visible from either the front or the rear and from either side. The lighting effect is comparatively very strong without the expenditure of an excessive amount of current from the car battery, this result being attained by the use of the divider plates having reflective faces. The construction is such that my improved device can be manufactured cheaply and expeditiously so as to be available to every motorist interested in making his driving as safe as possible. The critical parts of the mechanism are located in such position as to avoid likelihood of breakage of the parts and when parts are broken, they can be very quickly and very easily replaced by new parts.

While I have illustrated a preferred embodiment of my invention, many modifications might well be made without departing from the spirit of the invention, and I do not wish to be limited to the precise details of construction set forth, but desire to avail myself of all changes within the scope of the appended claims.

I claim:

1. In a stop light mechanism adapted for mounting at a position above the top of an automotive vehicle, the combination comprising a light housing including top and bottom plates having opposed peripheral retaining rim portions thereon, a wall of light pervious material extending between the top and bottom plates and retained therebetween by said retaining rim portions, means for securing the plates and wall in assembled relationship, a light socket secured to one of the plates internally of the housing, and a supporting structure for the housing including tubular members secured to one of the plates in spaced and substantially parallel relationship and extending laterally thereof, support bars telescopically engaging the opposite ends of each of said tubes to provide an adjustable supporting yoke for the light housing, means for releasably securing the bars in fixed positions relative to the tubes, said bars having angularly disposed end portions, brackets for securing the end portions of the bars to opposite sides of the top of an automotive vehicle, and one of said tubes and the bar connected thereto providing a conduit for a lead wire having one end connected to the light socket.

2. In a stop light mechanism for a motor vehicle, the combination of electric lamp means, means for mounting said lamp means on the body of the vehicle at a level at least substantially as high as the top of the body of the vehicle, and circuit means serving when the mechanism is operatively mounted on the vehicle to connect said lamp means with a battery on the vehicle through light switch means on the vehicle for keeping said lamp means energized electrically while the braking mechanism of the vehicle is in operation and for causing the lamp means to be deenergized when the braking mechanism is out of operation, said lamp means being mounted in a housing, and the lamp means and the housing being constructed and arranged for giving outside of the housing at at least some points thereabout a selected color light effect when the lamp is energized, a comparatively small portion of the housing wall at one side of the housing being made of material through which the light from the lamp means shows outside of the housing in a selected color, and the housing wall at at least a substantial portion of the remainder of the periphery of the housing being made of material through which the light from the lamp means shows outside of the housing in any alternative color other than said first named selected color.

3. In a stop light mechanism for a motor vehicle, the combination of electric lamp means, means for mounting said lamp means on the body of the vehicle at a level at least substantially as high as the top of the body of the vehicle, and circuit means serving when the mechanism is operatively mounted on the vehicle to connect said lamp means with a battery on the vehicle through light switch means on the vehicle for keeping said lamp means energized electrically while the braking mechanism of the vehicle is in operation and for causing the lamp means to be deenergized when the braking mechanism is out of operation, said lamp means being mounted in a housing, and the lamp means and the housing being constructed and arranged for giving outside of the housing at at least some points thereabout a selected color light effect when the lamp is energized, the said housing comprises oppositely facing cap members embracing side walls of stiff flexible plastic sheet material, and a bolt clamping said cap members together.

4. In a stop light mechanism for a motor vehicle, the combination of electric lamp means, means for mounting said lamp means on the body of the vehicle at a level at least substantially as high as the top of the body of the vehicle, and circuit means serving when the mechanism is operatively mounted on the vehicle to connect said lamp means with a battery on the vehicle through light switch means on the vehicle for keeping said lamp means energized electrically while the braking mechanism of the vehicle is in operation and for causing the lamp means to be deenergized when the braking mechanism is out of operation, said lamp means being mounted in a housing, and the lamp means and the housing being constructed and arranged for giving outside of the housing at at least some points thereabout a selected color light effect when the lamp is energized, a comparatively small portion of the housing wall at one side of the housing being made of material through which the light from the lamp means shows outside of the housing in a selected color, and the housing wall at at least a substantial portion of the remainder of the periphery of the housing being made of material through which the light from the lamp means shows outside of the housing in any alternative color other than said first named selected color, said comparatively small portion of the housing wall being made of plastic through which the light from the lamp shows in substantially its natural color outside of the housing, and at least a substantial portion of the remainder of the periphery of the housing wall is made of plastic through which the light from the lamp means shows red outside of the housing.

5. In a stop light mechanism for use on the top of the body of a motor vehicle having an electrical circuit including a battery, the combination of a housing having side wall portions through which light is adapted to pass readily, sockets in said housing for supporting electric lamps therein, circuit means for connecting said sockets together for connection with the electric circuit on the vehicle, and cross-bar means connected with said housing for supporting the housing on the body of the vehicle, said cross-bar means being in the form of a yoke having downwardly extending arms, and includes means provided for connecting said arms with the door lintels at opposite sides of the vehicle.

6. In a stop light mechanism for use on the top of the body of a motor vehicle having an electrical circuit including a battery, the combination of a housing having side wall portions through which light is adapted to pass readily, sockets in said housing for supporting electric lamps therein, circuit means for connecting said sockets together for connection with the electric circuit on the vehicle, and cross-bar means connected with said housing for supporting the housing on the body of the vehicle, said cross-bar means being in the form of a yoke having downwardly extending arms, and includes means provided for connecting said arms with the door lintels at opposite sides of the vehicle, said yoke comprising two tubular bars in spaced relationship to each other to which the housing is effectively secured, each of said tubular bars being formed of a plurality of pieces telescopically connected together to provide for longitudinal adjustment of the yoke, and the ends of the tubular bars being adapted to be connected with the lintels of the vehicle body by brackets having posts projecting upwardly from their upper faces for receiving the ends of the tubular members thereon.

HARVEY R. ROGERS.

REFERENCES CITED

The following references are of record in the file of this patent:

UNITED STATES PATENTS

| Number | Name | Date |
| --- | --- | --- |
| 1,013,947 | Neil | Jan. 9, 1912 |
| 1,074,537 | Abeles | Sept. 30, 1913 |
| 1,648,490 | Maltby | Nov. 8, 1927 |
| 1,692,516 | Reed | Nov. 20, 1928 |
| 1,784,884 | Smith | Dec. 16, 1930 |
| 1,893,369 | Jaros et al. | Jan. 3, 1933 |
| 1,972,090 | Getty | Sept. 4, 1934 |